Aug. 21, 1945.   C. RUNYAN   2,383,216
TRAILER VEHICLE
Filed June 30, 1944   3 Sheets-Sheet 1
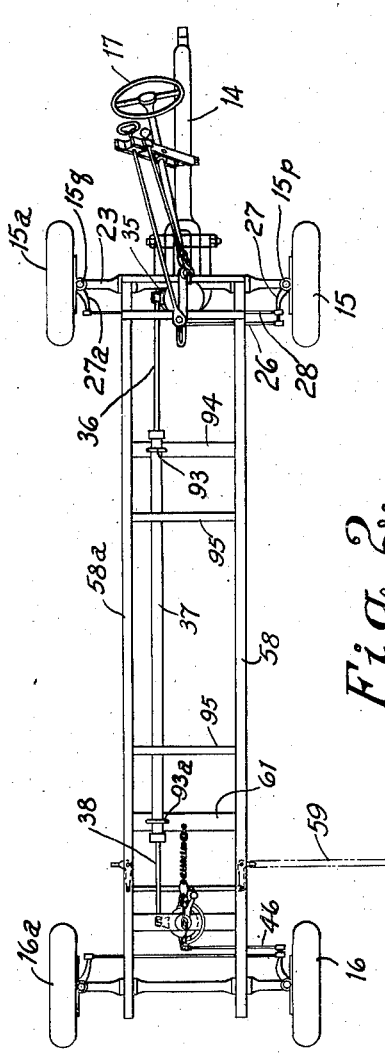
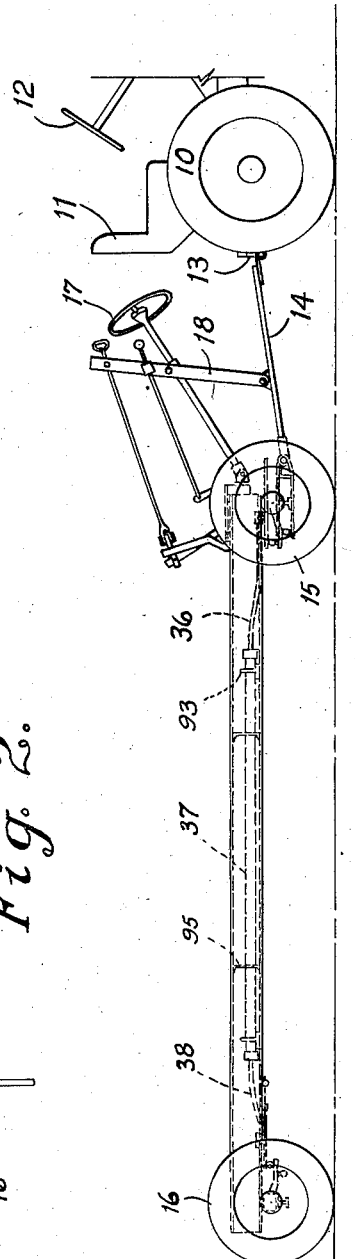
INVENTOR.
Charles Runyan
BY
Harris S. Campbell
ATTORNEY Aug. 21, 1945.    C. RUNYAN    2,383,216
TRAILER VEHICLE
Filed June 30, 1944    3 Sheets-Sheet 2
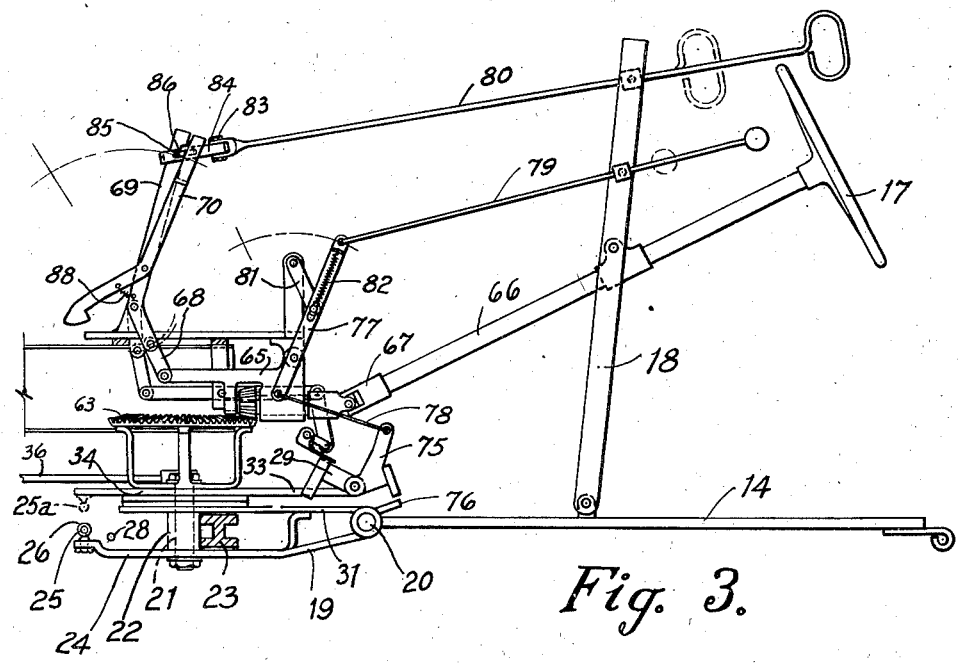
Fig. 3.
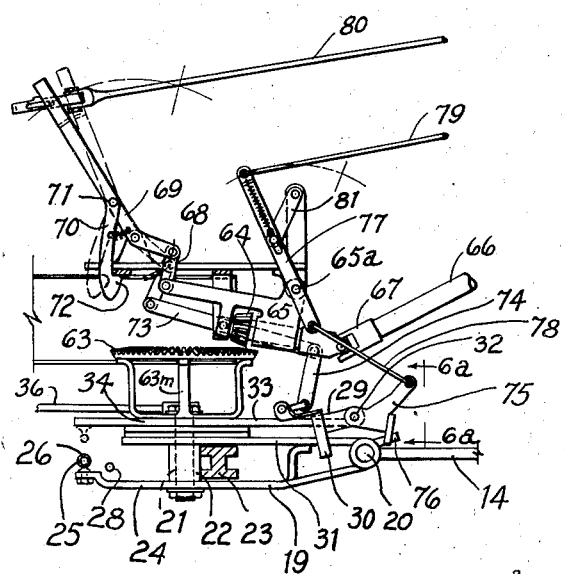
Fig. 4.
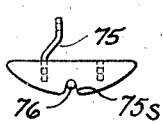
Fig. 6a.
Fig. 5.
Fig. 6.
INVENTOR.
Charles Runyan
BY Harris S. Campbell
ATTORNEY Aug. 21, 1945.    C. RUNYAN    2,383,216
TRAILER VEHICLE
Filed June 30, 1944    3 Sheets-Sheet 3

INVENTOR.
Charles Runyan
BY
Harris S. Campbell.
ATTORNEY

Patented Aug. 21, 1945

2,383,216

UNITED STATES PATENT OFFICE 2,383,216

TRAILER VEHICLE

Charles Runyan, Great Meadows, N. J.

Application June 30, 1944, Serial No. 543,018

15 Claims. (Cl. 280—33.55)

This invention relates to trailer vehicles and is particularly concerned with the self-supporting type of trailer having a pair of steerable front wheels and a tongue or draw bar for attaching to a tractor.

Trailers of this type are extensively used in farm work where they may be drawn behind a tractor or other vehicle and are readily connectable and disconnectable since they are self-supporting at all times.

It is an object of the present invention to provide additional steering means besides the tongue steering means so that the operator may have greater control when maneuvering in close quarters. One of the important objects of the invention is to provide manual steering mechanism for the rear wheels of the trailer which may be brought into use by the operator at will for such purposes as backing up into restricted places. Such use of the manual steering permits accurate control of the rear end of the trailer regardless of the movements of the tractor vehicle.

It is a further object of the invention to provide a manual steering system having operator's connections located so that the rear wheel steering may be controlled from the operator's position in the tractor vehicle.

In trailer vehicles of the type with which this invention is concerned it is desirable to have a short turning radius to permit following the tractor vehicle into the corners of fields, to make sharp turns through gates and for the many other situations in farm work calling for accurate maneuvering. It is desirable therefore to provide the trailer vehicle with rear wheel steering interconnected normally with the front wheels. In this fashion a trailer having a comparatively long wheel base may be given a turning radius permitting sharp turns.

It is an object of the present invention to provide a steering mechanism for the rear wheels which may be normally connected to the front wheel steering system for tongue steering but which may be quickly and easily disconnected from the tongue steering and steered manually by the operator for special purposes, such as when backing.

Another object of the invention is to provide a steering linkage system for the manual control of the rear wheels of a trailer together with linkage having means which may be quickly changed by the operator to permit conjoint operation of the front and rear wheels by the manual steering controls.

A still further object of the invention is to provide quick disconnect mechanism by means of which the rear wheel steering system may be disconnected from the front wheel steering system close to the rear wheels and supplemental manual steering, by a helper, may be accomplished.

A specific object of the invention is the provision of a positive and simplified steering transmission linkage between the front and rear wheels having means for accurate transmission of steering movements while permitting flexing of the trailer frame without adversely affecting the steering movements.

Another specific object of the invention is the provision of an engageable and dis-engageable gear and pinion by means of which manual steering may be transmitted.

Another object of the invention is to provide improved mechanism by means of which the normal tongue steering is disengaged and the manual control engaged.

How these and other objects and advantages are obtained will be clear from the following description of the drawings in which—

Figure 1 is a side elevation showing applicant's trailer vehicle attached to a tractor vehicle.

Figure 2 is a plan view of the trailer shown in Figure 1.

Figure 3 is a side elevation of the mechanism at the front end of the trailer vehicle to an enlarged scale.

Figure 4 is a view similar to Figure 3 showing the manual controls in disconnected position.

Figure 5 is an enlarged plan view showing the main control rod connection to the levers.

Figure 6 is a plan view of the latch part for interconnecting the tongue for steering operation.

Figure 6a is a view taken in the direction of arrows 6a, Figure 4.

Figure 7:
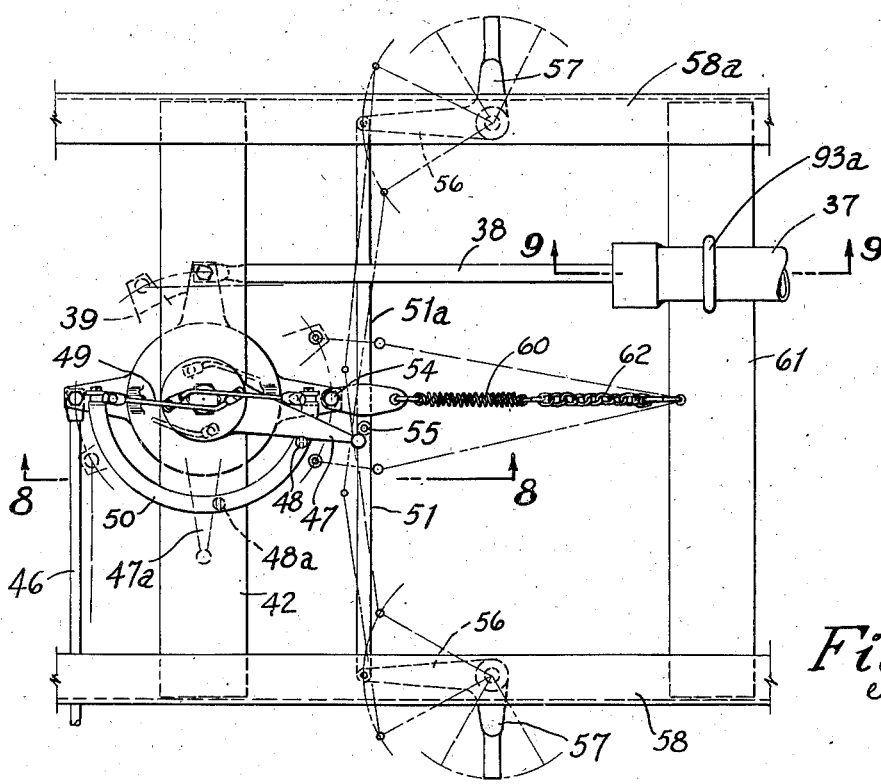
Figure 7 is a plan view of the control mechanism for the rear wheels of the trailer.

Referring to the figures, Figures 1 and 2 show the general arrangement of applicant's trailer mechanism and illustrate the manner in which it is attached to a tractor vehicle. The rear part of the tractor vehicle 10 is illustrated, there being a seat 11 and steering wheel 12. The trailer vehicle is connected to the tractor vehicle by means of a coupling illustrated at 13 and having pivots providing for universal movement. The tongue 14 is attached to the trailer vehicle in a fashion to transmit normal steering movements to both the front wheels 15 and the rear wheels 16 of the trailer in a fashion which will become apparent as the description proceeds. A trailer steering wheel 17 is supported by means of a supporting member 18 which is pivotally attached to the tongue 14 so as to permit various movements of the tongue 14 to occur during all phases of operation, particularly over uneven ground. It will be noted that steering wheel 17 is located in a position which is convenient to an operator in seat 11 when the trailer is attached to the tractor.

The constructional details of the front end of the vehicle including the steering mechanism are better illustrated in Figures 3 and 4. It will be noted that the trailer end of the tongue 14 is attached to a frame or bracket 19 by means of a pivot 20. The bracket 19 is pivotally supported to swing about a vertical pivot 21, which swinging movements are controlled by the tongue 14. The pivot 21 is supported in a bearing member 22 which in turn is secured to the front axle 23. Steering movements of the tongue 14 are therefore transmitted to the rearwardly projecting arm 24 of the frame 19, which arm supports a ball end member 25 to which is attached a steering cross link 26. Referring again to Figure 2, it will be seen that cross link or push rod 26 is attached to the end of the steering arm 27 of the wheel 15. A second transverse rod 28 connects arm 27 with the corresponding arm 27a of the left hand front wheel 15a. Wheels 15 and 15a are of course, pivotally mounted as indicated at 15p and 15q at opposite ends of the axle member 23 and respond to swinging movements of the tongue 14 in a fashion to produce proper steering movements, depending upon the angular excursion of the tongue 14.

In Figure 4 the control parts are illustrated in position to cause transfer of the normal tongue steering movements to the rear wheels as well as to the front wheels. It will be noted that in Figure 4 the latching part 29 is shown in lowered position. In this lowered position, the depending arms 30 engage the upper member 31 of the frame 19. Part 29 is pivotally attached at 32 to a forwardly projecting arm 33, which arm is part of member 34. Member 34 is pivotally mounted on pivot 21. A laterally projecting arm 35, also attached to part 34, extends to the left as illustrated in Figure 2. The forward end of longitudinal push rod 36 is pivotally connected to the end of arm 35. In this manner, swinging movements of the forwardly projecting arm 33 are transmitted to the laterally projecting arm 35 and thus steering movements of the tongue 14 are transferred to the longitudinal rod 36. The movement of rod 36 is transmitted through suitable push-pull mechanism the details of which will be described later. This mechanism is housed in tubular member 37 from the rear end of which housing push-pull rod 38 projects to connect to the steering mechanism for the rear wheels.

Figure 8:
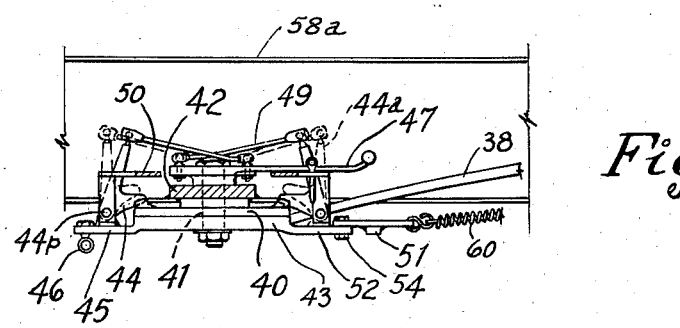
Figure 8 is a side elevational view taken on the line 8—8, Figure 7.

The details of the rear wheel steering mechanism are illustrated in Figures 7 and 8 where it will be seen that longitudinal rod 38 connects to an arm 39 which is attached to pivotally mounted member 40 by means of bolt 41 supported on transverse frame member 42. Movements of the arm 39 are thus normally transmitted to member 43 through latch elements 44. In turn, arm 45 transfers its swinging movements to transverse rod 46 by means of which steering motions are directed to the rear wheels in a fashion generally similar to that described for the front wheels. It should be noted, however, that the rear wheels 16, 16a are deflected in the opposite direction to the front wheels 15 and 15a under steering control by the tongue 14 thereby producing a small turning radius.

The rear wheels are arranged to permit independent steering movements when desired by an operator who may take his position alongside the rear end of the trailer and control through the medium of a bar which may be attached for steering purposes. The mechanism for permitting this mode of operation includes the latch parts 44 which are pivotally attached by pivots 44p to the rotatable member 43. When parts 44 are in their engaged position as indicated by the full lines in Figure 8, parts 40 and 43 are connected together to rotate in unison. It will be observed that plate 40 includes small projections adapted to be engaged by latch parts 44. Lever 47 may be moved to position 47a (Figure 7) by first removing the stop pin 48. After the lever 47 has been moved to its new position, stop pin 48 is placed in position 48a to retain the lever in position 47a until the operator desires its return to its engaged position. With the lever in position 47a, the members 44 take up the position 44a where they are disengaged from part 40 and thus allow the member 43 to be rotated without similar rotation of the part 40 to which is attached arm 39. Thus, movement of the rear wheels may be accomplished without moving the push rod connection from the front wheels.

The lever 47 is connected to latch part 44 by means of push rods 49 which are suitably shaped to extend past dead center position without interfering with the head of bolt 41 as illustrated in Figure 7. An arc-shaped supporting member 50 supported to rotate with the plate 43 provides for maintaining proper position of the lever 47 in either its engaged or disengaged position.

To provide an operating connection for steering the rear wheels when they are disengaged from the front wheel steering, a transverse push rod composed of two parts 51 and 51a is connected to forwardly projecting arm 52, which arm is attached to member 43. The pivotal connection to arm 52 is shown at 54. Further, the transverse rod parts 51 and 51a are connected with pivot 55 to permit various steering movements. The transverse rod 51, 51a is in turn attached to bell cranks having arms 56 and 57, there being a bell crank located in each side of the trailer frame, the right hand bell crank being pivotally supported on right hand frame member 58 and the left hand bell crank being similarly supported on frame member 58a. An extension bar 59 (see Figure 2) may be attached to the arm 57 at either side of the trailer to provide a powerful lever for manual steering by an operator.

The swinging movements of the parts during steering movements of the wheels are illustrated by various dotted positions of the arms in Figure 7. A spring 60 is anchored to transverse frame member 61 by means of chain 62. Spring 60 tends to return the steering linkage to neutral position after being displaced. This assists in bringing the parts back into position where registry of the latch members 44 is readily made to lock parts 40 and 43 together so that steering movements are transmitted to the rear wheels from the front end in normal fashion through the longitudinal push-pull rod.

The steering method just described by means of the extension bar 59 may be used when backing up operations are required in extremely restricted locations such as maneuvering the trailer into a carriage shed or into position for loading or unloading operations.

Returning now to Figures 3 and 4, the mechanism for permitting the use of trailer steering wheel 17 will be described. In Figure 4, the control mechanism is illustrated in position for transmittal of steering movements to the wheels by the tongue member 14 as was previously described. In Figure 4, the gear 63 is attached to rotate with member 34 by means of supporting legs 63m. Pinion 64 is shown in disengaged position. Pinion 64 is supported on frame 65 which is rotatable about pivot 65a. Steering movements from wheel 17 are transmitted by steering rod 66 through universal joint 67. The frame 65 is held in disengaged position by means of link 68 connected to lever 69. An adjacent lever 70 is pivotally supported at 71 on the lever 69. Lever 70 has a latch end 72 adapted to contact a frame member for retaining the lever 69 in position to support the gear in disengaged position. Also actuated by lever 69 is a beam member 73 which in turn is connected to engaging part 29 by means of link 74.

A safety latch member 75 engages pin 76 attached to frame member 19 to insure positive engagement. Safety latch member 75 is attached to lever 77 by means of rod 78 and is controlled by rod 79. As shown in Figure 6a, the latch part 75 is shaped in a manner so that slot 75s will latch over pin 76 if the tongue is swung into neutral position from either direction.

To disengage the tongue steering and engage the steering wheel 17, control member 79 is first moved to the position shown in Figure 3 thereby releasing the safety latch 75. It will be noted that lever 77 is equipped with a toggle member 81 and spring 82 which tends to retain the lever in either extreme position to which it is moved. The control rod 80 which is connected to actuate levers 69 and 70 is then moved to the position of Figure 3. The first part of the movement of rod 80 disengages the latch 72 after which further movement brings levers 69 and 70 into their new positions in which pinion frame member 65 has been lowered to cause engagement of pinion gear 64 with gear 63. Also, this movement of lever 69 has raised the latch member 29 to a position where it is disengaged from the top member 31 of the frame 19.

Figure 5 illustrates in greater detail the terminal connection of rod 80 to levers 69 and 70. Bolt 83 pivotally attaches rod 80 to the terminal member 84 in a fashion which permits swinging of the tongue with its supporting frame 18 without affecting the action of the terminal 84 and its attachment to the levers. Terminal member 84 is supported by a pin 85 projecting through the top of lever 69 and through slots 86 (see also Figure 3) in terminal member 84. Stop 87 projecting from terminal 84 is adapted to contact lever 70. Spring 88 normally urges lever 70 into a rearward position in which latch 72 will catch to retain the levers in rearward position when wheel steering is disengaged. To release the levers pulling on rod 80 first engages stop 87 against lever 70 thereby causing latch 72 to be disengaged after which the end of slot 86 engages pin 85 and moves both levers 69 and 70 forward to the position illustrated in Figure 3 where they are retained by virtue of the dead center position of link 68 until the operator wishes to disengage the rear wheel steering. To disengage the steering wheel 17, the handle of rod 80 is moved rearwardly causing the slot 86 to engage the pin 85 at its forward end and push the lever 69 rearwardly. With the slot in this position, the stop 87 permits lever 70 to move back into approximate alignment with lever 69 in which position latching as illustrated in the full lines of Figure 4 occurs.

The actual sequence of movements for disconnecting the manual steering wheel are as follows. First the rod 79 is returned to the position shown in Figure 4. This places the latch member 75 in position for latching. The tongue 14 is then moved to neutral position where latching of pin 76 in slot 75s takes place. All the steering parts are now in proper relative position and the control rod 80 may be moved to return the levers 69 and 70 to their rearward position (Figure 4). The locking member 29 moves down at the same time into position to lock arm 33 for movement with frame 19.

Figure 6 shows the shape of locking member 29 in plan view. The pivot axis 32 passes through members 89. A plate member 90 is provided with ears 91 at each end, which ears support an arcuate rod 92. Link member 74 connects to arcuate rod 92 at its lower end. With this construction, the swinging of locking member 29 during movements of tongue 14 is not interfered with and regardless of the position of tongue 14, disengagement of member 29 may be accomplished since the force applied through link 74 will be transmitted to rod 92 in a fashion to lift member 29 and disengage it from the projecting arm 31.

In certain instances such as when an extremely short turning radius is desired when backing the trailer, it will be useful to provide means for manual steering of the front and rear trailer wheels together. In such cases the operator may disconnect the ball socket which connects the cross link 26 to the ball 25 and replace it on the ball 25a shown in dotted outline in Figure 3. Since the front wheel control rod 26 is now connected to move with plate 34 it will respond to steering movements of the control wheel 17.

The longitudinal push rod system as shown in Figure 2 consists of front and rear external push rods 36 and 38 together with an internal push rod housed in tubular member 37. Tubular member 37 is supported on the frame at two points only, namely, by clamp bolt 93 at the forward cross frame 94 and clamp bolt 93a on the rear cross frame member 61. Where the tubular housing 37 passes through frame members 95, enlarged holes are provided to prevent contact between the frame members and the housing. In this way, twisting motions of the chassis are prevented from being transmitted to the push rod housing.

Figure 9:
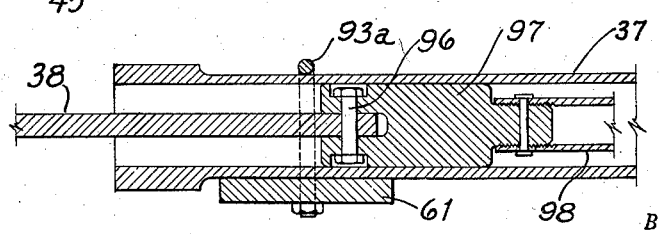
Figure 9 is a sectional view taken in the direction of the arrows 9—9, Figure 7, and illustrating the construction of the control rod member.

A detail view showing the construction at each end of the push rod housing is shown in Figure 9. Here it will be seen that the external rod 38 enters the end of the housing 37 and is connected by a vertical pivot 96 to a piston member 97. The piston member 97 is in turn rigidly attached to tubular push pull rod 98. The member 98 being housed in the heavy tubular housing is prevented from deflecting to any excessive degree since upon deflection it is supported by the inside wall of the housing 37. Thus, comparatively heavy loads may be transmitted through this control rod even though it is an extremely long column. The external push rods 36 and 38 are comparatively short in length and therefore can be made sufficiently strong without excessive size.

From the foregoing description it will be evident that I have provided an improved trailer steering mechanism which has particular advantage for use in maneuvering in restricted areas. The steering mechanism is versatile in nature. It permits disconnection of the normal tongue steering from the rear wheels of the vehicle and allows the tractor operator to independently steer the rear wheels from his tractor position through the medium of the trailer steering wheel. If desired both front and rear wheels may be manually controlled together. Further, the operator may disconnect the rear wheel steering linkage in a fashion which will permit them to be steered from a location alongside the rear wheels by an assistant. This is of advantage in cases where extremely close quarters are met and the trailer must be moved into such locations for purposes of loading and unloading.

I claim:

1. A self-supporting trailer having at least one rear pair of wheels and one front pair of wheels, a tongue member for attaching the trailer to a tractor vehicle, steering connections between said tongue member and both the front pair and rear pair of wheels, a steering wheel attached to the trailer and located within reach of the operator of the tractor vehicle, steering connections between said steering wheel and at least the rear pair of wheels, a manual control located adjacent said steering wheel for disconnecting the steering connections between the tongue member and the rear pair of wheels.

2. A self-supporting trailer having at least one rear pair of wheels and one front pair of wheels, a tongue member for attaching the trailer to a tractor vehicle, steering connections between said tongue member and the front pair of wheels, steering connections between the front wheels and the rear wheels arranged for normal tongue operation, a manually operated steering device attached to the trailer and located within reach of the operator of the tractor vehicle, movable means adapted to disconnect the tongue steering connections to the rear wheels to permit manual steering thereof, said movable means being actuable by a handle supported on the trailer within reach of the tractor operator.

3. A self-supporting trailer having at least one rear pair of wheels and one front pair of wheels, a tongue member for attaching the trailer to a tractor vehicle, steering connections between said tongue member and both front and rear wheels, a steering wheel attached to the trailer and located within reach of the operator of the tractor vehicle, steering connections between said steering wheel and at least the rear pair of wheels, movable means associated with both of said steering connections adapted to cause disconnection of the tongue steering connection when the wheel steering connections are effective and vice versa, an additional movable member adapted to clamp and lock said tongue in proper steering position when the steering wheel is out of effective action.

4. A trailer having a frame, a pair of rear wheels and a pair of front wheels, a tongue for attaching to a tractor vehicle, steering connections between the rear pair of wheels and the front pair of wheels adapted to move the rear wheels in an angular direction opposite to the front wheels, steering connections between said tongue and said pair of front wheels, manually movable means arranged to permit disconnection of the steering connections between the front and rear wheels, a manual steering device adapted to steer the rear pair of wheels when the rear wheel steering is disconnected from the front wheels.

5. A trailer having a frame, a pair of rear wheels and a pair of front wheels, a tongue for attaching to a tractor vehicle, steering connections between the rear pair of wheels and the front pair of wheels adapted to move the rear wheels in an angular direction oppsite to the front wheels, said steering connections including a movable longitudinal push-pull rod, a tubular casing surrounding said push-pull rod and supported on said frame, means for disconnecting said rear pair of wheels from said steering connections, a manually operable steering member supported by said frame near said rear wheels for steering said wheels when disconnected from said steering connections.

6. A trailer having a frame, a pair of front wheels and a pair of rear wheels mounted on said frame, a pivoted tongue for attaching the trailer to a tractor vehicle, steering mechanism interconnecting said tongue and said front wheels, steering interconnections between the front and rear wheels, a steering column supported at its forward end by a frame attached to said tongue, said frame being pivoted at said tongue and at said column, said column being supported at its rearward end by a universal joint member, means for disconnecting the steering interconnections between the front and rear wheels and means for connecting said steering column to permit manual steering of the rear wheels.

7. A four wheeled trailer having a tongue for attaching to a tractor with connections to cause steering of both the front and rear wheels thereof, a hand operated steering member supported within reach of the tractor operator, with steering connections to the rear wheels, movable means for causing said tongue steering connections to be inoperative with respect to the rear wheels whereby steering thereof may be accomplished by said hand member.

8. For a trailer having a frame, a pair of wheels at the rear end, a pair of wheels at the front end, a tongue normally connected to cause steering of both the front and rear wheels, a steering wheel supported on said tongue with steering connections to said rear wheels, said steering connections including a bevel pinion and gear member, and means for disconnecting the tongue from normal steering of the rear wheels, thereby permitting steering by said steering wheel.

9. A trailer vehicle having a frame, a pair of front wheels and a pair of rear wheels with steering interconnections therebetween, including a longitudinal push rod having a tubular casing supported on said frame at two points only, a plurality of steering means for said rear wheels including means for disconnecting the steering interconnections from the front wheels and manual means for applying steering movements to said rear wheels.

10. For a trailer vehicle having front and rear steerable wheels, a tongue for attaching to a tractor vehicle with connections for normal steering of front and rear wheels, a manually operated steering member, means for disconnecting the rear wheel steering from the normal tongue steering to permit steering by the manually operated member, an alternative steering connection for the front wheels permitting them to remain connected for tongue steering when the rear wheel steering is disconnected or permitting the front wheels to be steered manually with the rear wheels.

11. For a trailer vehicle having a frame, a front pair of wheels and a rear pair of wheels, a draw bar member for attachment to a tractor vehicle, steering connections between the draw bar member and the front wheels, steering connections between the draw bar member and the rear wheels, manually movable means for disconnecting the steering connections between the draw bar and the rear wheels, and a manual steering device adapted to steer the rear wheels when they are disconnected from the steering connections to the draw bar member.

12. For a trailer vehicle having a frame, a pair of front steerable wheels and a pair of rear steerable wheels supporting said frame, steering interconnections between the front and rear wheels including a longitudinal push rod having a tubular housing, said push rod being supported in said housing by a sliding piston-like terminal at each end thereof, said housing being supported on said frame at two points only thereby permitting flexing movements of said frame and unrestricted sliding of said push rod.

13. For a trailer vehicle having steerable front and rear wheels, a draw bar adapted to steer the front wheels, steering links connecting the front and rear wheels, means for disconnecting at least the rear wheels to permit manual steering, said means including a latch member adapted to transmit the steering movements of the tongue to the rear wheels when in latched position, a control for said latch member adapted to move it into or out of latched position, said latch member and said control being constructed so that when the latch is moved to latching position with the draw bar in a position out of registry therewith, movement of the draw bar will operate the latch to cause it to engage the draw bar when the registry position is reached.

14. A trailer vehicle having front and rear wheels, a draw bar with steering connections to both the front and rear wheels to cause steering movements of all wheels in response to movements of the draw bar, a hand lever operatively connected with the rear wheels to permit steering movements and means for disconnecting the steering connections between the draw bar and the rear wheels to allow steering by said hand lever.

15. A trailer vehicle having a pair of front wheels and a pair of rear wheels, a draw bar having steering connections to both pairs of wheels, means for disconnecting the rear pair of wheels from the draw bar steering either at the front or rear of the vehicle, means for manually steering the rear wheels from a plurality of positions including the forward end of the vehicle and either side of the vehicle adjacent the rear wheels.

CHARLES RUNYAN.